UNITED STATES PATENT OFFICE.

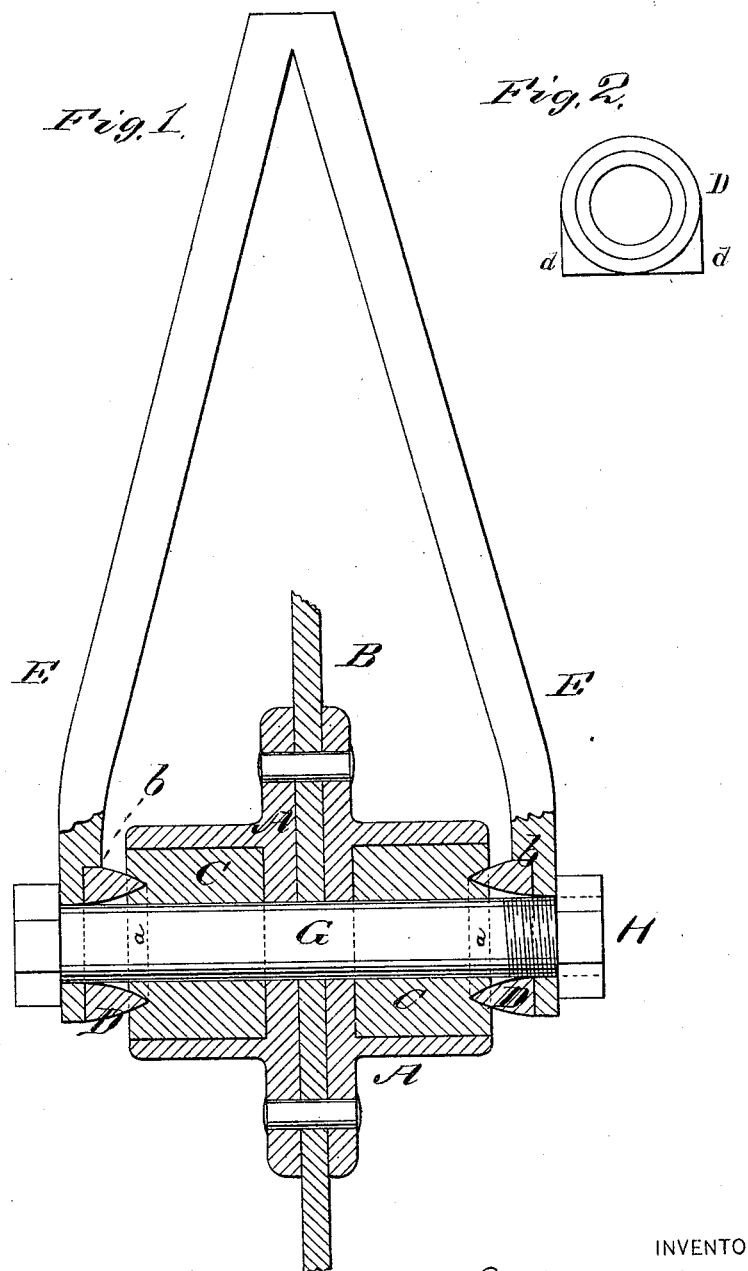

DAVID W. HUGHES, OF ST. LOUIS, MISSOURI.

IMPROVEMENT IN ROLLING-COLTERS.

Specification forming part of Letters Patent No. 178,443, dated June 6, 1876; application filed March 4, 1876.

*To all whom it may concern:*

Be it known that I, DAVID W. HUGHES, of St. Louis, in the county of St. Louis and State of Missouri, have invented a new and valuable Improvement in Rolling-Colters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse vertical section of my rolling-colter, and Fig. 2 is a detail view thereof.

My invention relates to rolling-colters or gage-wheels for plows; and has for its object to improve the construction of the hub or bearing for the same, so as to render them free from wear, and to obviate the use of oil, as will be hereinafter more fully set forth.

In the annexed drawing, A represents the metal hub, of ordinary construction, as used on the colter blade or wheel B. The hub A is provided with an interior lining, C, of wood, leather, rawhide, or metal, in the ends of which lining are formed circular concentric grooves *a*. In each end of the lining C is inserted a metal dust-check or collar, D, made in tapering circular form, and entering the correspondingly-shaped groove *a* in the lining. These dust-checks are clamped between the arms of the yoke E, that attaches to the plow, and secured by the axle G of the hub passing through the dust-checks and center of the hub.

The dust-checks are prevented from turning on the main axle by means of projecting ears or flanges *d* bearing against shoulders *b*, formed on the arms of the yoke. When the checks are forced into the grooves, and held to their place by screwing up the nut H on the axle, a double bearing is secured at the ends of the hub, and all dust or dirt perfectly excluded and prevented from entering the hub, and also preventing any lateral or wabbling motion to the blade when in use.

What I claim as new, and desire to secure by Letters Patent, is—

1. The dust-checks D D, provided with ears or flanges *d d*, in combination with the shoulders *b* on the arms of the yoke E, for the purposes herein set forth.

2. The combination of the colter-hub A, interior or lining C, with concentric grooves *a* at its ends, the dust-checks D, with flanges *d*, yoke E, with shoulders *b*, axle G, and nut H, all substantially as and for the purpose set forth.

In testimony that I claim the above I have hereunto subscribed my name in the presence of two witnesses.

DAVID W. HUGHES.

Witnesses:
GEO. O. ATHERTON,
JOHN F. DOWDALL.